No. 776,075. PATENTED NOV. 29, 1904.
G. W. LONG.
FRICTIONAL SCOURER FOR GRAIN OR OTHER SIMILAR PRODUCTS.
APPLICATION FILED NOV. 27, 1903.
NO MODEL. 3 SHEETS—SHEET 1.
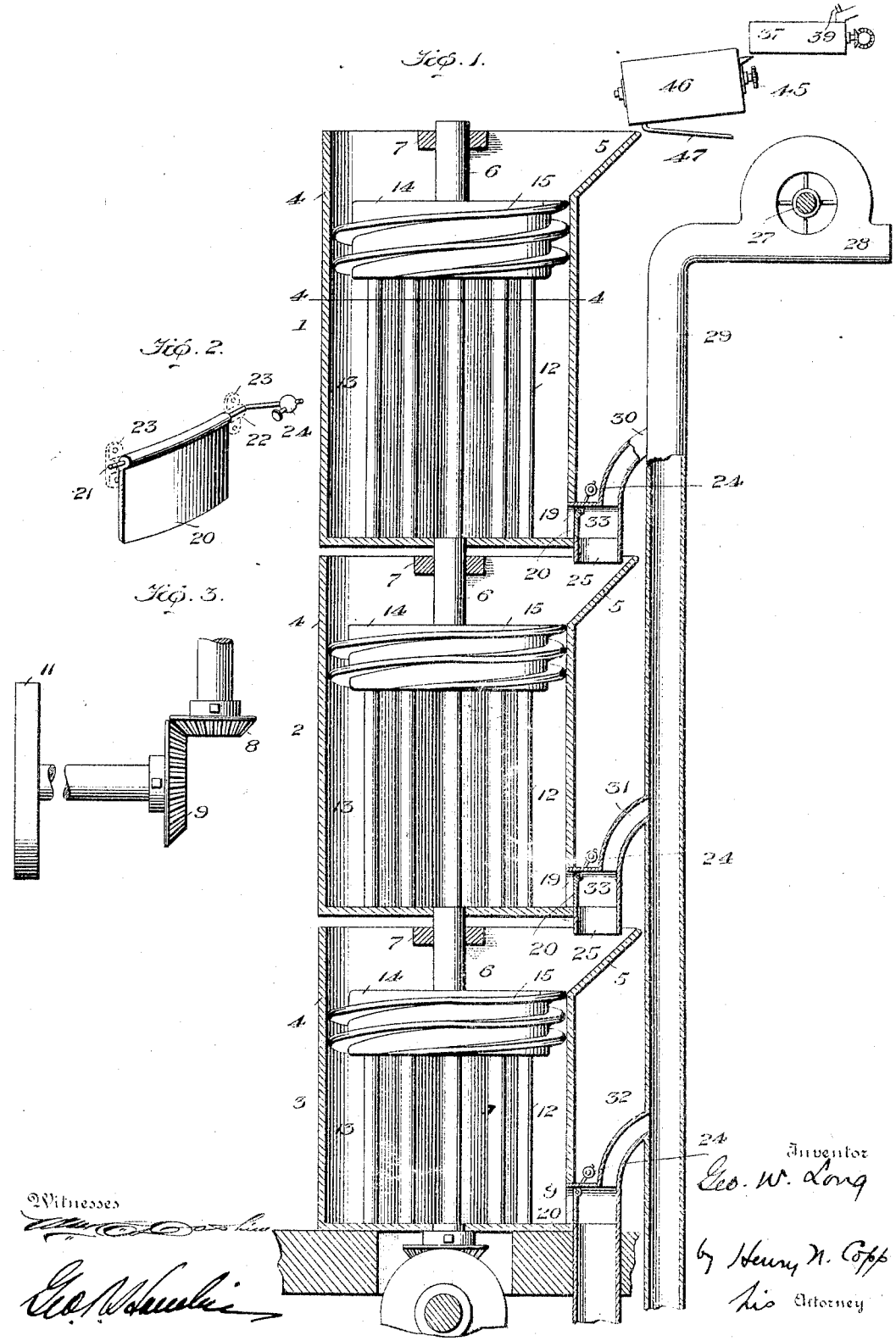

No. 776,075. PATENTED NOV. 29, 1904.
G. W. LONG.
FRICTIONAL SCOURER FOR GRAIN OR OTHER SIMILAR PRODUCTS.
APPLICATION FILED NOV. 27, 1903.
NO MODEL. 3 SHEETS—SHEET 2.
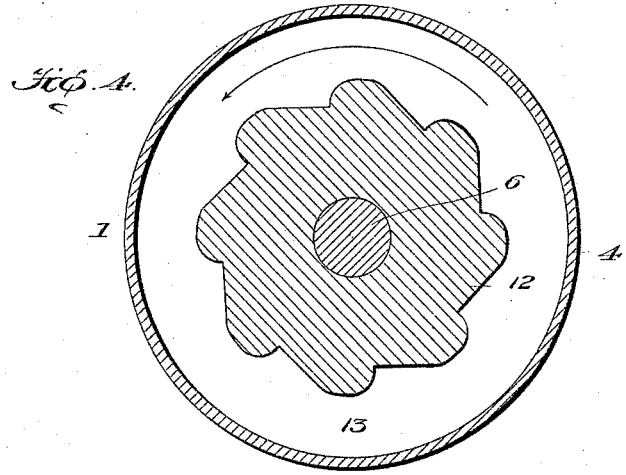
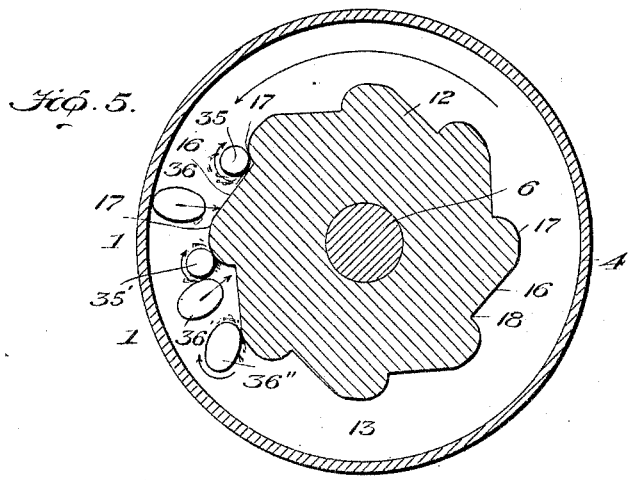
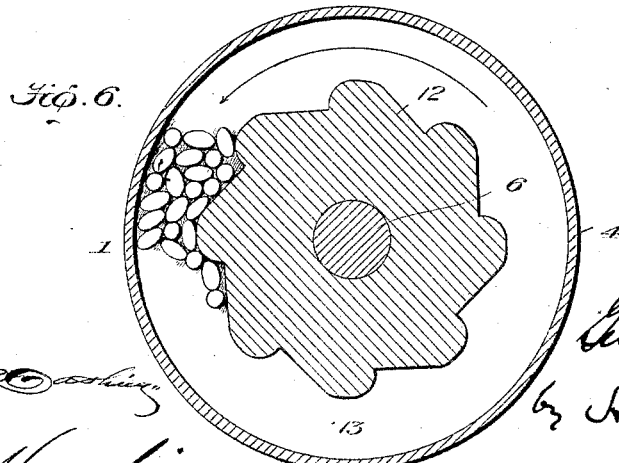

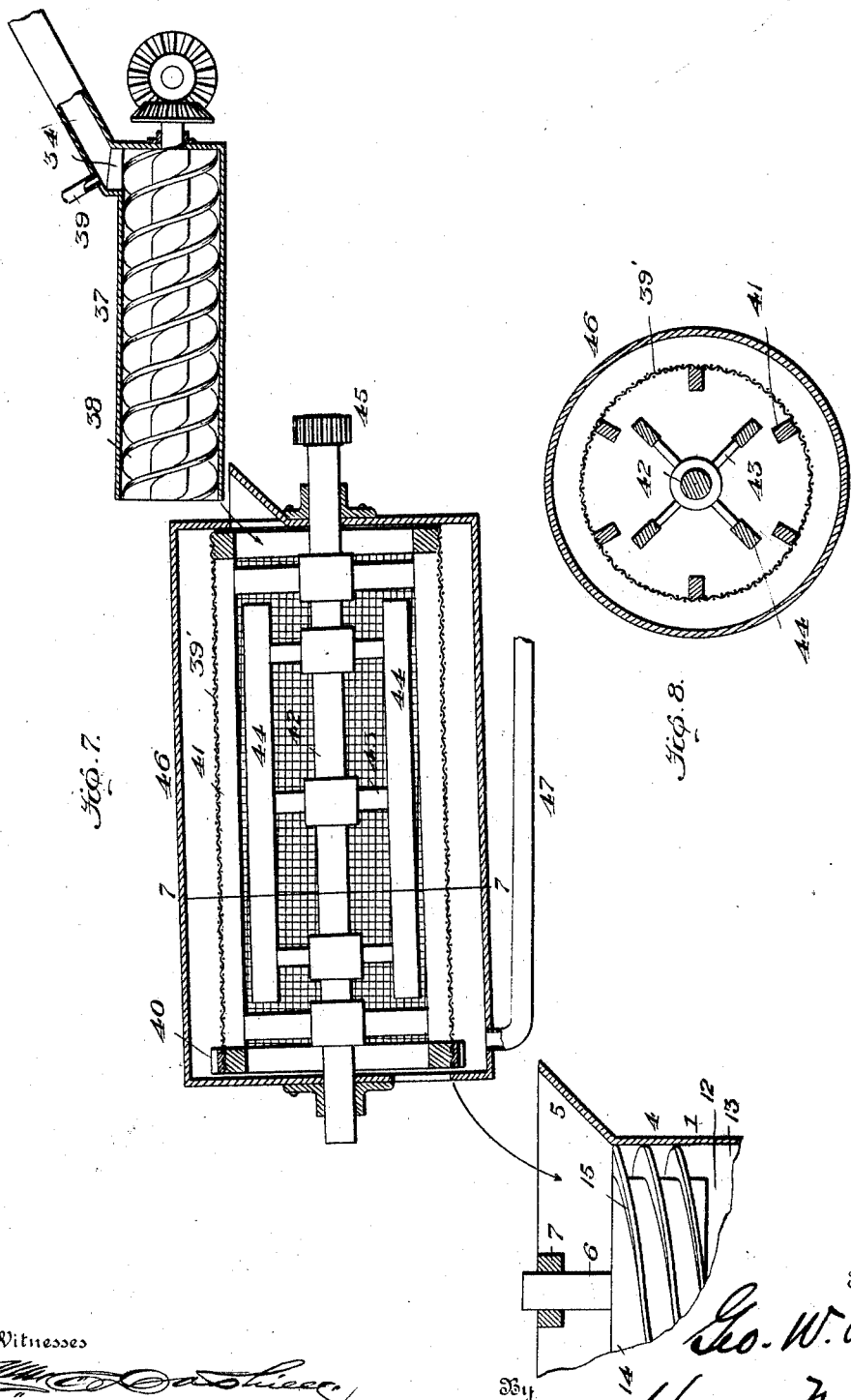

No. 776,075. Patented November 29, 1904.

UNITED STATES PATENT OFFICE.

GEORGE W. LONG, OF PORTLAND, OREGON.

FRICTIONAL SCOURER FOR GRAIN OR OTHER SIMILAR PRODUCTS.

SPECIFICATION forming part of Letters Patent No. 776,075, dated November 29, 1904.

Application filed November 27, 1903. Serial No. 182,849. (No model.)

*To all whom it may concern:*

Be it known that I, GEORGE W. LONG, a citizen of the United States, residing at Portland, county of Multnomah, and State of Oregon, have invented certain new and useful Improvements in Frictional Scourers for Grain or other Similar Products, of which the following is a specification.

My invention relates to friction-scourers for grain and other similar products.

Heretofore, so far as I am aware, in the scouring of grain, coffee, and other similar products having an inner covering which must be removed to render the same fit for use it has been impossible to completely remove this inner coating or covering of the grain, coffee, &c., and effect a perfect cleansing and polishing action. On coffee there sometimes appears a reddish substance which it has heretofore been impossible to remove, and on grain, such as wheat, present methods and machines are unsuccessful in removing the brownish-yellow bran adhering tenaciously to the kernel or to satisfactorily remove what is known as the "eye." In coffee the presence of the extraneous matter referred to depreciates the value of the coffee or renders it entirely unfit for use, while the bran or coating of wheat is unfit for consumption, although—as, for instance, with "flaked" wheat—it necessarily has to be eaten by the consumer.

The present invention has for its object the perfect removal of all inner coatings and coverings existing on grains of all kinds, particularly wheat, and from coffee and other like-covered products regardless of the tenacity or hardness of such coating and to effect a complete polishing action, remove the eye of the grain, and otherwise to provide a complete and finished product such as it has been impossible to produce heretofore.

To accomplish the foregoing object, I provide a machine comprising an outer cylinder having a smooth inner surface, an inner roll having flutes of novel form extending longitudinally thereof, and a feed device for introducing into and packing within the cylinder the product to be treated, together with other associated features described in detail hereinafter, the novel elements and combinations thereof being set forth in the claims hereto appended.

In order to satisfactorily carry out the object of the present invention, it is desirable to properly moisten or dampen the wheat, when wheat is to be treated, and to dampen the wheat sufficiently, so that when it is subjected to the scourer the bran will properly come off, and at the same time to prevent a surplus of water from accompanying the grains as they pass into the scourer I provide an improved and novel means for dampening the wheat comprising a rotary trommel-screen surrounded by a jacket and a rotary beater within the trommel-screen, together with a conveyer for taking in the grain and delivering it to the trommel-screen and which itself has means for feeding water to the grain, whereby the wheat is first dampened and then conveyed to the trommel-screen, which keeps the wheat agitated, while the more rapid rotation of the beater throws the wheat against the trommel-screen, and the surplus water is thrown through the screen and into the jacket and then drained off and the properly-dampened wheat either directly introduced from the trommel-screen into the scourer or a separate conveyer is used. This manner of dampening wheat and then removing the surplus water brings the bran, covering, or coat of the grain to such a condition that it can be more readily scoured in the scourer and yet without an accumulation of water in the scourer or any undesirable effects.

My machine carries on a method of treating the grain or other product undergoing scouring whereby the grain or other product is packed in the cylinder and around the fluted roll in a mass and the individual grains or seeds are turned over and over as well as rotated on their independent axes. Those grains nearest the roll are turned faster than the next outer ring of grains, and the individual grains in each succeeding ring of grains move slower than the grains in the ring of grains nearer the roll on out to the inner wall of the cylinder. The peculiar configuration of the roll, having straight portions and rounded flutes of novel configuration, is the cause of the peculiar and novel method of action on the grains and of the grains upon each other, and these flutes turn the grains over and over and also rotate them on their longitudinal axes, and as the roll rotates the grains turned by the rounded flutes are displaced, and other grains work in along the straight portions of the roll to take the place of the displaced grains and are rotated and turned over in turn. This peculiar turning or rubbing action of the individual grains accomplishes the most perfect removal of the inner covering and also the removal of the hard covering lying immediately next the grain itself, and it also takes out what is known as the "eye" of the grain. In other words, no matter what degree of hardness the coat or coats may possess they are removed by the rubbing and polishing action, which I believe to be entirely novel with me. In the treatment of coffee the reddish coating which I have referred to heretofore is completely removed, while in the case of wheat the brownish-yellow bran or coat which adheres so tenaciously to the grain that hitherto it has been impossible to completely remove it is entirely taken off. The resulting product is clean and highly polished in every respect. In the case of wheat the grains have a whitish appearance and clearly show how the eye has been taken out and the bran coat removed. Wheat treated by my machine has a very different appearance from wheat treated by other scouring-machines with which I am familiar, and so far as I am aware the scouring of wheat has not been carried on heretofore in a manner which will give a polished and clean white product, such as is produced by my present invention.

In the practical application of the machine I find it desirable in order to accomplish the most perfect cleaning and polishing action to successively introduce the coffee or grain to a plurality of, say, three scourers built according to my invention, the product of one scourer of the series being introduced to the action of the second scourer and the second scourer having its product directed to the third scourer. To take off the detached bran and covering from each scourer, I find it desirable to provide an air-suction device, which may conveniently consist of a suction-fan and piping leading to the outlet of the given cylinders. In order to retain the grain, coffee, &c., in the cylinder, so that it may be properly compacted by the feeding device, and also to allow it to automatically pass out continually, I provide a pressure gate-valve, which may conveniently consist of a hinged gate with an adjustable weight.

In the present application I lay claim to the machine herein disclosed, which at this time I have found to be the most convenient and perfectly-acting form the invention may assume, and in the application executed of even date herewith I lay claim to the method of scouring wheat, coffee, &c., which may be carried out by the present machine, although such method is not necessarily restricted to the use of a machine such as I have set forth herein.

I wish it to be understood that in the present invention there is no grinding or disintegrating action on the product being treated and that the invention is a scouring and not a grinding mill.

In the accompanying drawings, Figure 1 is an elevational view with certain parts in section, illustrating the invention as used in a series of three scourers, each independently embracing the invention, and also showing the general arrangement of the devices for dampening and removing the surplus water from the wheat prior to introduction in the scourer; Fig. 2, a detail of the regulating or pressure gate-valve; Fig. 3, a detail of a convenient form of driving means which may be employed; Fig. 4, an enlarged section taken on line 4 4 of Fig. 1, showing the peculiar and novel shape of the roll; Fig. 5, a similar view taken on line 4 4 of Fig. 1, illustrating a few grains of wheat on an enlarged scale and provided with arrows to indicate the end-over-end turning and the individual rotation of the grains; Fig. 6, a similar view showing how the grains are packed in between the roll and the cylinder, it being understood that the entire space around the roll is filled with the grains of wheat, as illustrated; Fig. 7, a longitudinal section of the system for dampening the grain and relieving it of its surplus water and introducing it to the action of the first scourer, and Fig. 8 a cross-section on line 7 7 of Fig. 7.

As shown in Fig. 1, the scourer is usually coupled up in a series of three independent scourers; but it is understood that more or less may be used. These scourers are shown at 1, 2, and 3. Each scourer has a cylinder 4, which is smooth on its interior and provided at its upper portion with a receiving-lip 5. Extending centrally and vertically of the cylinders 4, which are in superposed alined arrangement, is a shaft 6, journaled in suitable bearings 7 and carrying a pinion 8, driven by a gear 9 on a shaft 10, which is turned by a belt-pulley 11, Fig. 3.

Secured to the shaft 6 are the rolls 12, one being provided for each cylinder 4, and these cylinders and rolls are preferably of decreasing heights from the uppermost roll to the lowermost roll of the series. Each roll 12 is considerably smaller in diameter than the cylinder 4 to provide a space 13 for the packing of the grain or other product to be treated therein. Superposed upon the roll is a feed and packing screw 14, having a continuing spiral flange 15, which is adapted to snugly yet easily fit the interior of the cylinder. The peculiar form of the roll and its action is clear from Figs. 4, 5, and 6. The roll is provided with a plurality of straight flat surfaces 16, any number of which may be used and which give the roll a general polygonal shape, it being understood that these straight flat surfaces 16 extend the full length of the roll from top to bottom. The end of a preceding surface 16 and the crest of a succeeding surface 16 are joined by longitudinal curved flutes 17, which extend the full length of the roll from top to bottom, as shown in Fig. 1, and are preferably struck on arcs from the center of the roll. These curved or rounded flutes 17 are quite different from abrupt sharp teeth or abrupt angular ribs, such as have been employed in some instances on grinding-mills heretofore known to the art, and their action is very different from such prior ribs or sharp teeth, it being of the essence of my invention that these flutes have a general rounded form which will act as a frictional turning means for the individual grains being treated and will prevent any continued lodgment in the grooves or notches 18, formed by the straight surfaces 16 and the flutes 17. Such lodgment in prior ribbed rolls causes a disintegration of the grain or product being treated, which it is the express object of my invention to prevent, as my object is to scour the product and not disintegrate it.

A rectangular discharge-opening 19 is made through the side of the cylinder 4, at the bottom thereof, and a curved gate-valve 20 (shown in detail in Fig. 2) controls this opening. This gate-valve is provided with a pivot 21 at one end and an arm 22 at the other end, which are journaled in lugs or ears 23 on the outside of the cylinder 4. The arm 22 extends angularly to the gate-valve and is provided with an adjustable weight 24, by which the closing pressure of the gate-valve can be regulated. The gate-valve retards the grain or other product being scoured and lets it out continually from the cylinder at a predetermined rate.

To allow the grain to pass from the upper scourer 1 to the next scourer 2 and from the scourer 2 to the scourer 3, I provide the drop-spouts 25, while from the lowermost scourer the completely scoured or cleansed grain or other product being treated is taken off through a suitable receptacle through a spout 26. To prevent the chaff—such as bran and other coverings removed from the wheat, coffee, or other product which has been treated—from passing from one scourer to the other, a suction-fan 27 is employed, which has a discharge 28 and a suction-pipe 29, having branches 30, 31, and 32 leading to the short pipes 33.

It is desirable to dampen the wheat before introduction into the series of scourers in order that the bran may be more readily scoured off, and for the purposes of dampening and removing the surplus water I provide the means shown in Figs. 1, 7, and 8. The wheat is initially introduced in an opening 34 in a casing 37, containing a screw conveyer 38, and the water is spouted in at 39, where the wheat enters. The conveyer 38 delivers the wheat to a trommel-screen 39', which may be turned by any suitable means, such as an annular gear 40 thereon. Within the trommel-screen and extending longitudinally thereof are a number of ribs 41. Within the trommel-screen is a rotary beater comprising a shaft 42, arms 43, and bars or paddles 44, extending longitudinally and connected to the arms 43. This beater may be revolved by a gear 45 in any preferred manner and is adapted to turn three or four times as fast as the trommel-screen turns. The trommel-screen is surrounded by a jacket or casing 46, which has an outlet or take-off 47. The trommel-screen is preferably slightly inclined and may be used to directly deliver the wheat into the upper scourer 1; but, if preferred, a conveyer may be interposed between the trommel-screen and the scourer. The water and wheat are mixed by the conveyer 38 and then pass into the trommel-screen, the ribs 41 of which continually lift the wheat and then let it drop, and it is continually struck by the beater-paddles 44 and also back against the trommel-screen, which relieves the wheat of the surplus water, the water being thrown through the meshes of the trommel-screen and into the jacket 46, but the wheat being too large for the meshes of the said screen does not pass through. The wheat when delivered from the trommel-screen has been properly dampened, so that the bran and covering will be removed by the scourer; but it has been relieved of all surplus water and when introduced into the upper scourer is fed by the screw 14 into the upper scourer-cylinder and keeps passing the grain or other product to be treated into said cylinder and introducing it to the action of the roll 12 and eventually packs the space 13 full. The gate-valve 20 remains closed until the packing pressure has become such that it is adapted to give way to said pressure, and when this occurs the product being treated at the upper part of the cylinder is in a condition to be passed into the second scourer 2. In this connection it will be observed that the screw 14 snugly fits the cylinder 4, so as only to be adapted to turn therein easily, and this snug fitting insures the most perfect feed and packing of the product in the cylinder, so that it will be in the best condition to be acted upon by the roll 12. The roll 12 turns in the direction shown by the arrows in Figs. 4, 5, and 6, and it is obvious that by having the flange or screw 15 inclined oppositely and by reversing the arrangement of the straight portions 16 and flutes 17 the roll will operate in the same manner in the opposite direction.

The action of the roll will be clearly understood from Figs. 5 and 6. In Fig. 5 the numerals 35 and 35' represent grains of wheat which have their longitudinal axes vertical—that is, with their ends toward the observer— while the numerals 36, 36', and 36" designate other grains, which have their longitudinal axes in a horizontal plane. It will be understood that the grains are shown enlarged and that only a few of them are disclosed in this view, as in Fig. 6 it is clear that the grains are packed in tightly. Assuming the grain 35 to be on end and in the notch between the flat portion 16 and the rounded flute 17, as the roll turns in the direction of the arrow the grain 35 will rotate on its longitudinal axis, as shown by its small arrow, and will thereafter, owing to the rotation of the roll, pass up on the rounded flute 17, making way for the passing in toward the flat portion 16 of the grain 36, as indicated by its small arrow, which grain is in a horizontal position. As the roll turns the flat portion 16 passes along the grain 36, turning it end over end, and said grain eventually passes on to the rounded flute 17. The numeral 35' represents the manner in which the grain 35 would pass up on the rounded portion 17 to make way for a succeeding grain 36', which in turn is turned around to make space for a succeeding grain 36". As the roll turns, this action continues, some of the grains being turned over and over end over end, and as individual grains in the ring of grains next the roll are individually rotated the grains thereof are displaced laterally into the compact mass of grains in the space 13, and succeeding grains in outer rings move in toward the roll to occupy the spaces previously occupied by the grains which have been displaced by the action of the roll. This action continues during the rotation of the roll, and the result of this peculiar method of turning the individual grains results in the most perfect removal of the coverings, as illustrated in Fig. 5 by the detached parts, and the bran which adheres so tightly to the grain and which it has not been possible to remove heretofore from grain is taken off. The grain or product being treated is continually fed in at the top and works out at the bottom of each cylinder 4 and out through the pressure gate-valve into the next cylinder below and finally out through the spout 26 in its completely polished and cleansed condition ready for use. The suction continually takes off the bran and chaff, which is crowded out into the pipes 33, so that it does not get into a succeeding scourer.

I wish to call attention to my use of a cylinder having a smooth interior. This construction prevents any disintegration of the grains and assists in insuring a polished condition of the grain. It will also be understood that the rubbing or frictional action of the different rings of grain upon each other and the rubbing or frictional action of the independent grains upon each other is also responsible for the perfect cleansing of the grain from its coverings.

The product of my machine and the method which I have disclosed is white and clean in the case of wheat and a very superior product to that produced by all scouring-machines and methods I have known.

Having thus described my invention, what I claim as new, and desire to secure by Letters Patent, is—

1. In a machine for scouring grain and other similar products, the combination with a grain-receptacle having a smooth unobstructed cylindrical interior surface, of a revoluble roll within and of appreciably smaller size than the interior of the cylinder, said roll having exteriorly-projecting, smooth, unobstructed, rounded flutes arranged longitudinally thereof at intervals therearound and separated by unobstructed, smooth, straight, interdental portions extending longitudinally of the roll.

2. In a machine for scouring grain and other similar products, the combination with a cylinder having a smooth interior, of a rotary feed and pressure screw for feeding the grain or other similar product to the cylinder and compressing it therein, said screw fitting the cylinder, and a revoluble roll within the cylinder which is of appreciably smaller diameter than the cylinder whereby a space is provided around the roll and between it and the cylinder, said roll having longitudinally-disposed smooth rounded flutes and longitudinally-disposed smooth straight portions adapted, in connection with the smooth interior of the cylinder, to impart a rotary or turning motion to the individual grains or particles which are under compression, whereby the grain or other similar product is subjected to a polishing and scouring action without disintegration.

3. In a machine for scouring grain and other similar products, the combination with a plurality of scourers each comprising a receptacle having a smooth interior, a feed and pressure screw for compacting the material within the receptacle, and a rotary roll having longitudinally-disposed rounded flutes for imparting individual turning to the grains or products under compression, said receptacles of the different scourers having means to deliver the partially-scoured product from one receptacle to a succeeding receptacle, and suction means for taking off the scourings or chaff from each receptacle.

In testimony whereof I hereunto affix my signature in presence of two witnesses.

GEORGE W. LONG.

Witnesses:
E. EDMONSTON, Jr.,
M. C. VEITENHEIMER.